(12) United States Patent
Roggendorf

(10) Patent No.: US 10,696,180 B2
(45) Date of Patent: Jun. 30, 2020

(54) METHOD AND SYSTEM FOR PROVIDING A CHARGING PARK HAVING A PLURALITY OF CHARGING POINTS

(71) Applicant: Dr. Ing. h.c. F. Porsche Aktiengesellschaft, Stuttgart (DE)

(72) Inventor: Christoph Roggendorf, Markgröningen (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 20 days.

(21) Appl. No.: 16/169,264

(22) Filed: Oct. 24, 2018

(65) Prior Publication Data

US 2019/0160954 A1    May 30, 2019

(30) Foreign Application Priority Data

Nov. 28, 2017  (DE) .................. 10 2017 128 092

(51) Int. Cl.
*H02J 7/00* (2006.01)
*B60L 53/10* (2019.01)
(Continued)

(52) U.S. Cl.
CPC ............. *B60L 53/11* (2019.02); *B60L 53/22* (2019.02); *B60L 53/63* (2019.02); *B60L 53/64* (2019.02);
(Continued)

(58) Field of Classification Search
USPC ........................................................ 320/109
See application file for complete search history.

(56) References Cited

U.S. PATENT DOCUMENTS 9,783,068 B2   10/2017  Eger et al.
10,131,239 B2  11/2018  Herke et al.
(Continued)

FOREIGN PATENT DOCUMENTS

DE    102015110023 A1    12/2016
DE    102015224075 A1     6/2018
(Continued)

OTHER PUBLICATIONS

German Search Report for German Application No. 10 2017 128 092.8, dated Sep. 5, 2018, with partial translation-9 pages.
(Continued)

*Primary Examiner* — Bryce M Aisaka
(74) *Attorney, Agent, or Firm* — RatnerPrestia

(57) ABSTRACT

A method and corresponding system for providing a charging park having a plurality of charging points, in which all of the charging points are connected to a medium-voltage grid by a common transformer with overloading capability. A power electronics system is provided at each charging point, which power electronics system is designed to perform a quick-charging operation of a connected electrically driven vehicle that is to be charged, and a power drawn from the medium-voltage grid jointly by the charging points at a respective time is monitored centrally and/or decentrally and continuously at a grid contact point connected upstream of the transformer in the direction of the medium-voltage grid. An average power drawn from the medium-voltage grid jointly by the charging points is in each case adjusted over a prescribed time interval.

13 Claims, 2 Drawing Sheets

(51) Int. Cl.
    *B60L 53/63*     (2019.01)
    *B60L 53/67*     (2019.01)
    *B60L 53/64*     (2019.01)
    *H02J 7/04*     (2006.01)
    *B60L 53/22*     (2019.01)
    *G05F 1/67*     (2006.01)
    *H02J 3/46*     (2006.01)
    *B60L 53/14*     (2019.01)
    *B60L 53/66*     (2019.01)

(52) U.S. Cl.
    CPC ............... *B60L 53/67* (2019.02); *G05F 1/67* (2013.01); *H02J 3/46* (2013.01); *H02J 7/0027* (2013.01); *H02J 7/045* (2013.01); *B60L 53/14* (2019.02); *B60L 53/665* (2019.02); *B60L 2230/16* (2013.01); *B60L 2260/10* (2013.01)

(56) References Cited

U.S. PATENT DOCUMENTS

| | | | |
|---|---|---|---|
| 2013/0179061 A1* | 7/2013 | Gadh | H02J 3/14 701/123 |
| 2013/0307486 A1 | 11/2013 | Chang | |
| 2014/0039710 A1 | 2/2014 | Carter et al. | |
| 2014/0089016 A1 | 3/2014 | Smullin et al. | |
| 2015/0165917 A1 | 6/2015 | Robers et al. | |
| 2015/0314696 A1 | 11/2015 | Wang et al. | |
| 2015/0328999 A1* | 11/2015 | Dureau | H02J 1/102 320/109 |
| 2017/0018924 A1 | 1/2017 | Wormley et al. | |

FOREIGN PATENT DOCUMENTS

| | | |
|---|---|---|
| EP | 2505421 A1 | 10/2012 |
| JP | 2015507914 A | 3/2015 |
| KR | 20120041498 A | 5/2012 |
| KR | 20130025201 A | 3/2013 |
| WO | 2013026464 A1 | 3/2013 |

OTHER PUBLICATIONS

Tenbohlen, S., et al., "Assessment of the overload capacity of transformers using online monitoring systems," 2000, 9 pages, vol. 99, No. 1-2, Elektrizitätswirtschaft.

Australian Examination Report for Australian Application No. 2018226446, dated Jul. 26, 2019, 3 pages.

Rauscher Stoecklin, "Overload Capacity of Oil Distribution Transformers", Technical Information Sheet, 2015, with English translation, 5 pages.

Koren Office Action for Korean Application No. 10-2018-0145865, dated Mar. 25, 2020, 8 pages.

* cited by examiner

METHOD AND SYSTEM FOR PROVIDING A CHARGING PARK HAVING A PLURALITY OF CHARGING POINTS

CROSS-REFERENCE TO RELATED APPLICATION

This application claims priority to German Patent Application No. DE 10 2017 128 092.8, filed Nov. 28, 2017, the contents of such application being incorporated by reference herein in their entirety.

FIELD OF THE INVENTION

The present invention relates to a method for providing a charging park having a plurality of charging points and to a system for supplying electrical power to a charging park having a plurality of charging points.

BACKGROUND OF THE INVENTION

As the number of electric vehicles and vehicles with an electric drive increases, the necessity of designing a charging infrastructure for vehicles of this kind increases. This means that publicly accessible charging parks, in particular having quick-charging stations located therein, have to be provided along roads with a particularly high level of traffic. In particular, planning of a quick-charging infrastructure and of what are known as HPC (High Power Charging) charging parks that are to be provided in this case makes it possible to drastically reduce charging operations that are to be performed at the charging columns. For this purpose, however, it is necessary that a connection by means of a medium-voltage grid is designed for more than 150 kW per charging point or charging station. There is provision for the quick-charging stations to be equipped with 150 to 350 kW or more. In HPC charging parks, a connection by means of a medium-voltage grid is generally necessary in this case even from two charging points or charging stations. For a connection having such high powers that are to be provided, an operator of the respective HPC charging park requires a corresponding grid connection having a power in the range of a few MVA. In the case of quick DC charging, charging currents of up to 500 A DC are demanded. As a result, electric vehicles can be charged in a few minutes. This means that the aim is to minimize the charging times through increased power transmission, wherein the increased power transmission does not, however, have to be provided by the respective charging park operator alone but instead also by the operator of the respective medium-voltage grid. However, even today the free availability of powers in many medium-voltage grids is greatly restricted. In this case, a respective grid operator of a respective medium-voltage grid always plans with a static permanent load in the case of a granting of network accesses. An operator of a charging infrastructure or of a charging park has to pay what is known as a demand rate annually for providing power through the network operator of the respective medium-voltage grid that supplies power thereto. In Europe, said demand rate is currently on average around 80 EUR/kVA. The annual fees for HPC charging parks, that is to say for charging parks having quick-charging points, which in each case are intended to provide a power of 350 kW or more, are enormous as a result.

To reduce the grid connection costs that therefore arise, quick-charging parks are designed, for example, with what is known as a simultaneity factor. In this case, it is assumed that a full power is never demanded at the same time at charging points of the respective charging park by vehicles connected to said charging points. In general, a charging electronics system that is to be provided in the charging park or at the charging points is in this case also implemented with a corresponding simultaneity factor. Nevertheless, if, in a given case, a full power should be required at all of the charging points, the respective charging operations to be performed at the individual charging points are limited and a corresponding charging time of the individual vehicles connected to said charging points is increased accordingly.

US 2014/0089016, which is incorporated by reference herein, discloses a centralized, server-based system and a method for managing and reserving parking spaces that are capable of charging an electric vehicle. The described system handles sets of parking spaces as exchangeable, pooled resources so that a user of an electric vehicle can book a parking reservation with requirements by virtue of said user specifying the parking at a desired location. The parking spaces provided serve selectively only for parking or for charging. The parking spaces are in this case operated as a common parking area and each space has equal access to a charging station. The server comprised by the system determines the availability of the charging capacity within a parking time window and the user of a respective vehicle can select a parking time up to the maximum charging time that is required to charge the electric vehicle.

Against the background of the prior art, described hereinafter is a charging infrastructure that makes it possible to temporarily provide an increased power demand for charging electric vehicles in a manner that is optimized in terms of operating costs.

SUMMARY OF THE INVENTION

A method for providing a charging park having a plurality of charging points is proposed, in which method all of the charging points or charging stations are connected to a medium-voltage grid by means of a common transformer with overloading capability. In this case, a power electronics system is provided at each charging point, which power electronics system is configured to perform a quick-charging operation of a connected electrically driven vehicle that is to be charged. Furthermore, a power drawn from the medium-voltage grid jointly by the charging points at a respective time is monitored centrally and continuously at a contact point connected upstream of the transformer with overloading capability in the direction of the medium-voltage grid, wherein an average energy drawn from the medium-voltage grid jointly by the charging paints is in each case adjusted over a prescribed time interval. As an alternative, decentral measurement at the charging points or a combination is also possible.

A transformer is generally a static device that has two or more windings and that converts, through electrical induction, a system of AC voltage and AC current, in this case drawn from the medium-voltage grid, generally with different values at the same frequency, in order to transmit electrical energy. In principle, transformers can be operated temporarily with a higher power, that is to say in overload, while maintaining a maximum permissible temperature increase when a present permanent loading was lower than 100%.

The transformer with overloading capability according to aspects of the invention is preferably designed in such a way that it can be operated in overload on average for at least 30 minutes, wherein the latter is generally dependent on the prevailing temperature ratios in the region of the transformer and the heat capacity of the transformer itself.

In one configuration, a billing interval of a grid operator of the medium-voltage grid is selected as the prescribed time interval over which the average power drawn from the medium-voltage grid jointly by the charging points is adjusted. In this case, in a further configuration, the prescribed time interval can be in the range of from 5 to 60 minutes, particularly in the range of from 10 minutes to 30 minutes and more particularly of 15 minutes. This means that a time interval whose length is in the range of from 5 minutes, 6 minutes, 7 minutes, . . . , 30 minutes is possible and in this case is optionally, in particular, a length of 15 minutes.

In a further configuration, the average power drawn from the medium-voltage grid jointly by the charging points is adjusted over the prescribed time interval at the maximum to an established maximum power. This means that, based on the continuously monitored power drawn from the medium-voltage grid jointly by the individual charging points at a respective time within the prescribed time interval, it is possible to control a situation in which the average power drawn from the medium-voltage grid by the charging points reaches only at the maximum the established maximum power over the entire prescribed time interval. This means that, in the case of a power being drawn jointly by the charging points that exceeds the established maximum power at times at the beginning of the prescribed time interval, the power jointly drawn from the medium-voltage grid is to be down-regulated in each case at subsequent times within the prescribed time interval so that at the end of the prescribed time interval the average power withdrawn through the charging points over the entire prescribed time interval reaches at the maximum the established maximum power.

In a further configuration, a grid connection power requested by a charging park operator is selected as the maximum power established for the prescribed time interval. The grid connection power requested by the charging park operator corresponds to the grid connection power that the charging park operator requests from an operator of the medium-voltage grid and receives therefrom and has to pay a price established in advance therefore. The price to be paid is associated with a power withdrawn over a determined time interval, which means that an established maximum power cannot be exceeded within a prescribed time interval. The time interval prescribed for this by a grid operator of the medium-voltage grid is generally approximately 30 minutes, within which a grid connection power that is likewise prescribed by said grid operator or requested by the charging park operator is established.

This means that the power drawn from the medium-voltage grid jointly by the charging points at a respective time is monitored centrally and continuously and is adjusted in each case dynamically for the average power drawn from the medium-voltage grid jointly by the charging points at a respective time depending on the maximum power prescribed for the prescribed time interval and is distributed across the plurality of charging points in accordance with demand required in each case from said charging points.

As a result, it is possible that, in a partial interval of the prescribed time interval or at individual times of the prescribed time interval, the power withdrawn from the medium-voltage grid jointly by the charging points can exceed the average maximum permissible power to be withdrawn as long as the average power withdrawn over the prescribed time interval does not exceed the established maximum power. The temporary withdrawal of an "increased power" that results here is furthermore also made possible by the transformer with overloading capability, which is operated temporarily in overload for these time intervals or at these times. However, since the partial intervals of the prescribed time interval or even the individual times are generally below the time in which the transformer with overloading capability can be operated in overload according to its design, no danger at all for the transformer or for the environment in connection therewith can arise therefrom.

In one possible configuration, a transformer that can be operated in overload for a minimum of 30 minutes is selected as the transformer with overloading capability.

In a further configuration, when the method according to aspects of the invention is carried out, a calculation for determining an overloading capability of the transformer with overloading capability runs along online and, at a respective time, free overloading capabilities of the transformer are communicated to a control unit that actuates the respective charging points, so that the control unit that actuates the respective charging points can adjust and regulate precisely which power is allocated to which charging point depending on requests from the respective charging point. This ensures that the respective charging points can be supplied with power to the greatest extent possible according to the powers requested by the respective charging points taking into account the transformer and the design thereof and taking into account the requests from the medium-voltage grid.

According to aspects of the invention, the charging park is therefore regarded as an entire system and a total power draw by the charging points is monitored on the medium-voltage side, alternatively is monitored decentrally too. Due to the transformer with overloading capability that is provided in accordance with the invention, and the full expansion of all of the charging points with a charging electronics system for providing a full power, it is possible to provide a full power at each charging point at the same time as long as in this case only one partial interval of the prescribed time interval is required. By means of the central monitoring at the grid contact point, the power withdrawn from the medium-voltage grid jointly by the charging points is no longer reduced statically to the grid connection power requested with a simultaneity factor but an average power is regulated over the prescribed time interval, generally over the billing interval of the grid operator of the medium-voltage grid, which is generally 15 minutes. It is therefore possible to temporarily exceed the requested grid connection power without having to pay further fees when the established maximum power is not exceeded in the billing interval overall, that is to say on average. Since quick charging, that is to say operation of the respective charging points with full power, requires only a few minutes on account of the real charging curves of the vehicles to be charged respectively, the electric vehicles connected to the respective charging points can also be fully charged at the same time without extending the charging time.

A system for supplying electrical power to a charging park having a plurality of charging points is also provided. In this case, a power electronics system is provided at each charging point, which power electronics system is designed to perform a quick-charging operation of a connected electrically driven vehicle that is to be charged. The system according to aspects of the invention comprises at least one transformer with overloading capability, by means of which all of the charging points can be coupled to a medium-voltage grid, a first monitoring unit, which is arranged at a grid contact point connected upstream by means of the transformer in the direction of the medium-voltage grid and is configured to monitor a power drawn from the medium-voltage grid jointly by the charging points at a respective time centrally and/or decentrally and continuously, and a regulating unit, which is designed to adjust an average power drawn from the medium-voltage grid jointly by the charging points in each case over a prescribed time interval.

In one configuration, the regulating unit is configured to adjust the average power drawn from the medium-voltage grid jointly by the charging points over the prescribed time interval at the maximum to a power established for the prescribed time interval. In this case, as already mentioned above, the power is generally a maximum power prescribed by a grid operator of the medium-voltage grid, which power is requested from the operator of the medium-voltage grid by an operator of the charging park and is also paid for accordingly according to a contract.

In a further configuration of the system according to aspects of the invention, the transformer with overloading capability is a transformer that is designed so that it can be operated in overload for at least 30 minutes. In this case, both the heat capacitance of said transformer and the temperatures prevailing during operation are to be taken into account.

In a further configuration, the system according to aspects of the invention comprises a control unit, which is configured to actuate the respective charging points of the charging park and to distribute the electrical power provided from the medium-voltage grid by means of the transformer across the plurality of charging points depending on a demand requested by said charging points.

In a further configuration, the system according to aspects of the invention comprises a second monitoring unit, which is configured to carry out a calculation method for determining an overloading capability of the transformer with overloading capability online during operation of the transformer and, at a respective time, to communicate free overloading capabilities of the transformer to the control unit that actuates the respective charging points so that the control unit is capable of allocating the jointly withdrawn power to the respective charging points or charging stations depending, on the free transmission capacities of the transformer transmitted here.

The system according to aspects of the invention is designed, in particular, to execute the method according to aspects of the invention described above.

It is conceivable that the first monitoring unit comprised by the system according to aspects of the invention and the control unit that actuates the respective charging points of the charging park are combined in one unit and accordingly both technically communicatively connected to the grid contact point and to the individual charging points. However, as an alternative thereto, it is also conceivable that the first monitoring unit and the control unit form units separate from one another, but are communicatively connected to one another in wired or wireless fashion in order to be able to exchange information by means of said connection so that the control unit can suitably actuate and accordingly supply respective power to the respective charging points on account of the data transmitted by the first monitoring unit with respect to the jointly withdrawn power of the respective charging points.

Further advantages and configurations of the invention emerge from the description and from the appended drawing.

It is self-evident that the features mentioned above and the features yet to be discussed below may be used not only in the respectively specified combination but also in other combinations or individually without departing from the scope of the present invention.

BRIEF DESCRIPTION OF THE DRAWING

The invention is schematically illustrated in the drawing reference to an embodiment and is described in detail with reference to the drawing.

DETAILED DESCRIPTION OF THE INVENTION

The figures are described cohesively and comprehensively and the same components are assigned to the same reference symbols.

Figure 1:
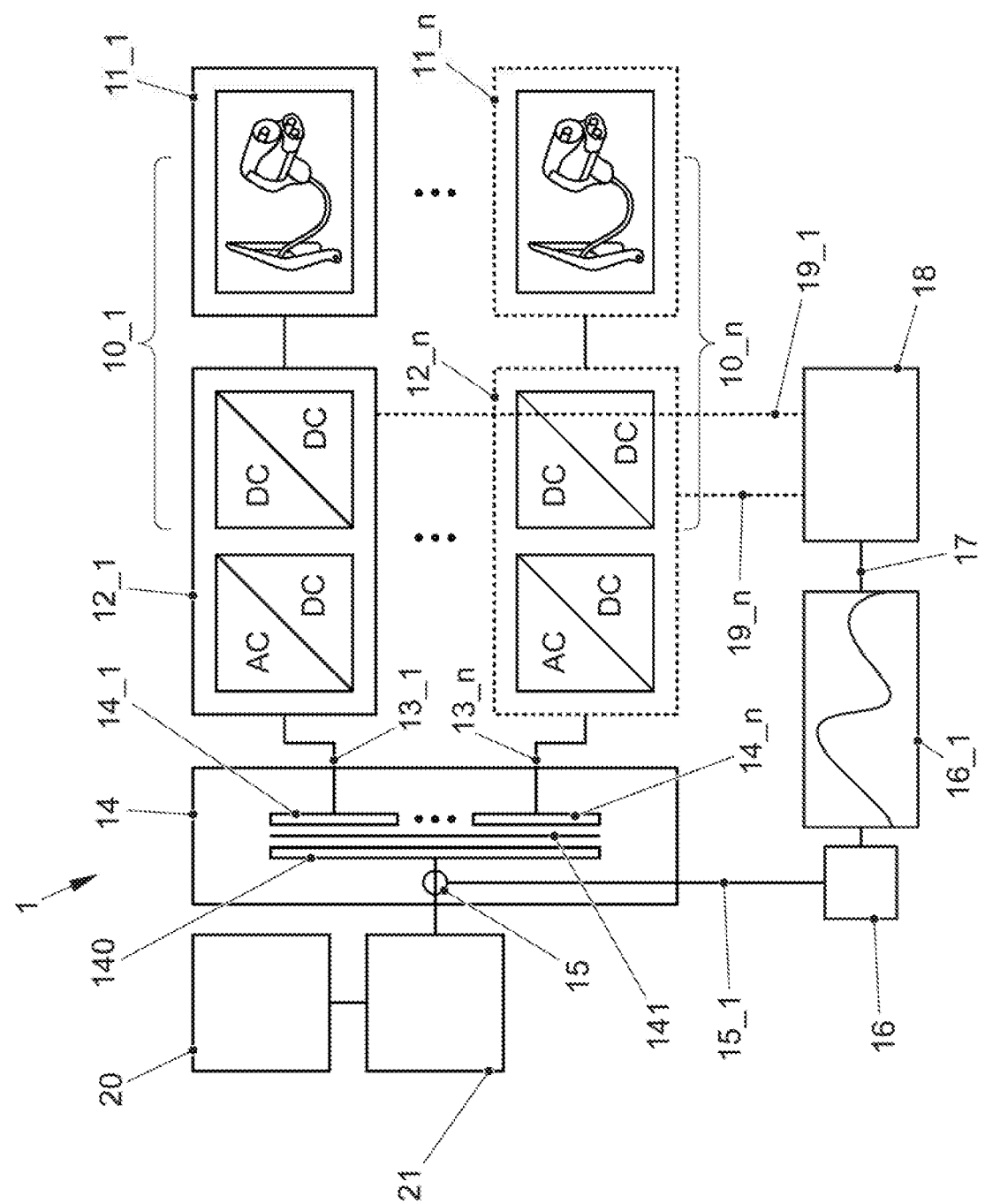
FIG. 1 shows a schematic illustration of an embodiment of the system according to aspects of the invention for use of an embodiment of the method according to aspect of the invention.

FIG. 1 shows an embodiment of the system 1 according to aspects of the invention. The system 1 according to aspects of the invention is designed to supply electrical power to a plurality of charging points 10 . . . 1, . . . , 10 . . . n. Each charging point 10 . . . 1, . . . , 10 . . . n illustrated here is furnished with a power electronics system 12 . . . 1, . . . , 12 . . . n, which is designed to carry out a quick-change operation of a connected electrically driven vehicle that is to be charged. An electrically driven vehicle that is to be charged is to be connected in this case by means of a respective charging column 11 . . . 1, . . . , 11 . . . n associated with a respective power electronics system 12 . . . 1, . . . , 12 . . . n of a charging point 10 . . . 1, . . . , 10 . . . n. The charging columns 11 . . . 1, . . . , 11 . . . n are in this case connected directly to the power electronics systems 12 . . . 1, . . . , 12 . . . n respectively associated with said charging columns. The power electronics systems 12 . . . 1, . . . , 12 . . . n generally comprise, as schematically illustrated here, a rectifier in order to convert AC voltage to DC voltage and a DC voltage converter connected in series therewith in order to convert the converted DC voltage to a DC voltage suitable for the connected vehicle that is to be charged.

The respective charging points 10 . . . 1, . . . , 10 . . . n are connected to a transformer 14 with overloading capability, which is likewise comprised by the system according to aspects of the invention, by means of a respective line 13 . . . 1, . . . , 13 . . . n. The transformer 14 with overloading capability is designed to convert a medium voltage, which is withdrawn from a medium-voltage grid 20, to a low voltage and to provide said low voltage to the respective charging points 10 . . . 1, . . . , 10 . . . n via the respective lines 13 . . . 1, . . . , 13 . . . n. To this end, the transformer 14 comprises on the input side, that is to say on the side in the direction of the medium-voltage grid 20, a first winding 140 and on the part of the charging points 10 . . . 1, . . . , 10 . . . n a multiplicity of secondary windings 14 . . . 1, . . . , 14 . . . n. The ratio of the numbers of turns of the respective coils and/or windings at the input to the output side is selected here in such a way that the medium voltage received on the input side corresponds on the output side, that is to say in the direction of the charging points, to a suitable low voltage. As indicated by the line 141 that is provided in parallel with the primary winding 140, the transformer 14 with overloading capability provided here is electrically isolated.

The transformer 14 with overloading capability draws its voltage, from a medium-voltage grid 20 via a switchgear installation 21. Both the medium-voltage grid 20 and the switchgear installation 21 are generally operated by a grid operator of the medium-voltage grid and are independent of the system 1 and of the charging park, which is generally operated by a charging park operator. At a grid contact point 15 in the connection of switchgear installation 21 to transformer 14, a power drawn from the medium-voltage grid 20 jointly by the charging points at a respective time is now monitored centrally and/or decentrally and continuously on the charging-park side by means of a first monitoring unit 16, which is connected to the grid contact point 15 by means of a connection 15 . . . 1. The power withdrawn jointly at the respective times is recorded and the values are plotted in a graph 16 . . . 1 that is to be updated continuously. Based on the continuous plotting of the power withdrawn jointly by the charging points at respective times, it is possible to check how high an average power that is withdrawn from the medium-voltage grid 20 jointly by the charging points in a prescribed time interval is or will be. Since the grid operator of the medium-voltage grid 20 generally prescribes, depending on the contract, a time interval in which a determined power can be withdrawn at a fixed price by the customer, in this case the charging park operator, it is possible, by means of the first monitoring unit 16 and according to the time interval prescribed by the grid operator, which time interval is generally 15 minutes, to plot which joint power is withdrawn at a respective time within the prescribed time interval and thereby to adjust an average power over the fixedly prescribed time interval by means of a regulating unit, that is to say to determine a power that is respectively still permissibly able to be withdrawn at future points located within the time interval, so that the average power withdrawn jointly by the charging points will not exceed the maximum established power that has been agreed by the grid operator with the charging park operator. This means that the average power withdrawn by the charging points in the prescribed time interval of 15 minutes corresponds at the maximum to the established maximum power for the prescribed time interval agreed between the charging park operator and the medium-voltage grid operator. As a result, it is possible that a power above the established maximum power can also be withdrawn by the charging points at individual times or at partial intervals of the prescribed time interval of, for example, 15 minutes; however, on average, at the maximum the prescribed maximum established power is withdrawn over the prescribed time interval. By continuously plotting the withdrawn power by way of the first monitoring unit 16, it is possible to control the withdrawn power Lo accordingly and to supply power to the individual charging points 10 . . . 1, . . . , 10 . . . n via respective connections 19 . . . 1, . . . , 19 . . . n to the respective power electronics systems 12 . . . 1, . . . , 12 . . . n by means of a control unit 18 that is also provided, which is communicatively connected 17 to the first monitoring unit 16. Respective power electronics systems 12 . . . 1, . . . , 12 . . . n then convert the respective power associated therewith and provided by the transformer 14 via the line 13 . . . 1, . . . , 13 . . . n to a power that is to be provided to the charging columns 11 . . . 1, . . . , 11 . . . n. The first monitoring unit 16 and the control unit 18 can in this case be implemented in a unit as well. Furthermore, in general, the regulating unit, which is designed to adjust an average power drawn from the medium-voltage grid jointly by the charging points in each case over a prescribed time interval, is coupled to the first monitoring unit 16 and is generally implemented in a unit. This means that the first monitoring unit 16, the regulating unit and the control unit 18 are generally stored and operated on a server.

Figure 2:
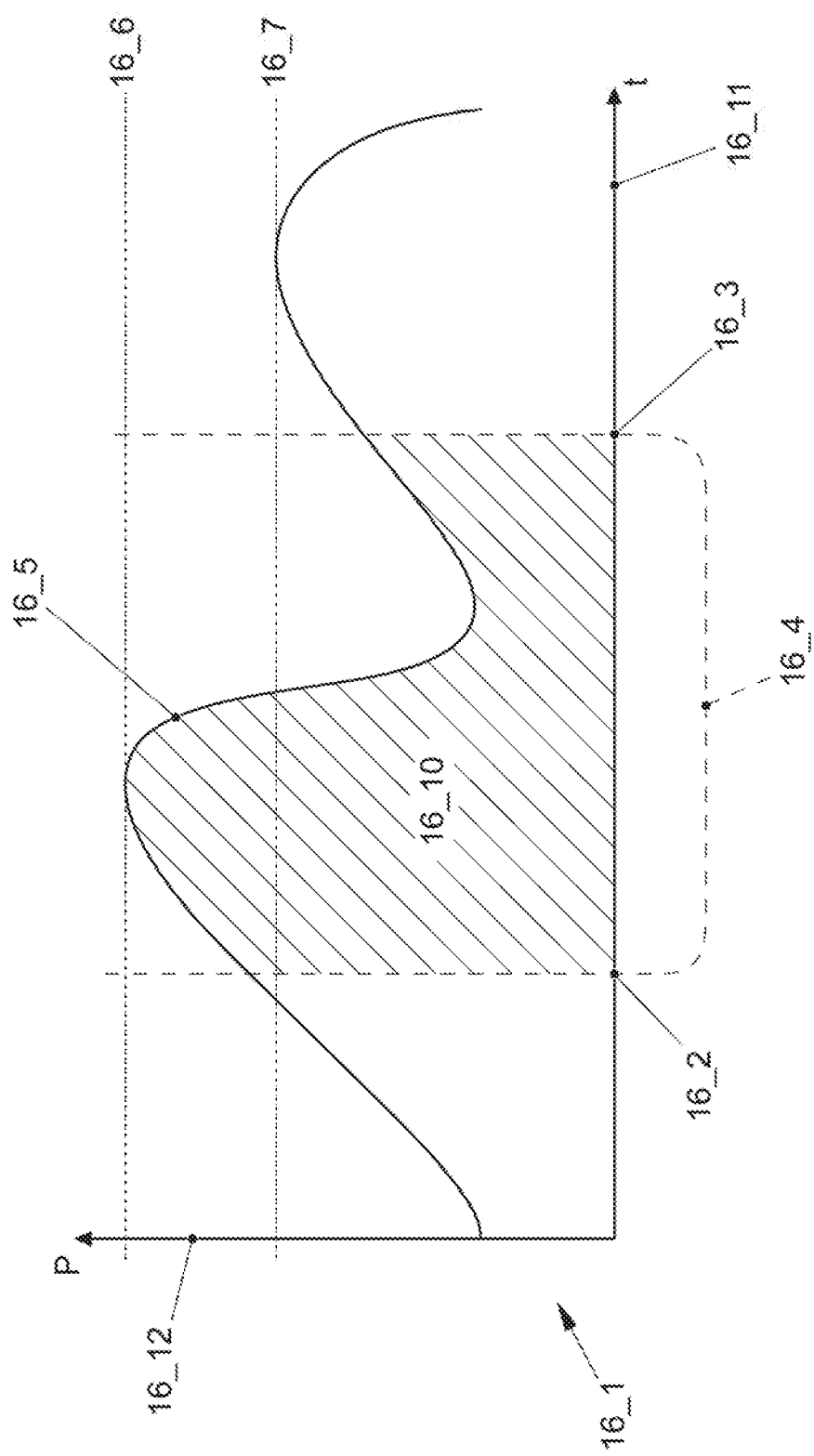
FIG. 2 shows how a plurality of charging points of a charging park are supplied with electrical charge in one embodiment of the method according to aspects of the invention on the basis of a schematic graph.

FIG. 2 shows a schematic illustration of the values that are recorded continuously by the first monitoring unit 16 as a monitoring graph 16 . . . 1. In the graph 16 . . . 1, the time is plotted on an abscissa 16 . . . 11 and the power P withdrawn from the medium-voltage grid is plotted on an ordinate 16 . . . 12. The time is plotted here in minutes and the power is generally plotted in kVA or kW. The time interval $t_{slot}$ 16 . . . 4 prescribed by the grid operator of the medium-voltage grid runs from a time $t_0$ 16 . . . 2 up to a time $t_1$ 16 . . . 3 and is generally 15 minutes. The time interval $t_{slot}$ 16 . . . 4 indicates in this case a time interval and thus a period and is not focused on the fixedly prescribed times but then begins to run again at time $t_1$ up to a time $t_2$ appropriately spaced apart from t1. $t_0$ 16 . . . 2 results, for example, as $t_0 = t_{Start} + (n^* t_{slot})$, wherein n indicates a number of measurements. The curve 16 . . . 5 shown indicates the profile of the joint power withdrawn from the medium-voltage grid 20 by all of the charging points by means of the transformer 14. The power $P_{max}$ 16 . . . 6 corresponds to a power that can be provided by means of the respective power electronics systems 12 . . . 1, . . . , 12 . . . n to the respective charging columns 11 . . . 1, . . . , 11 . . . n, using which power a quick-charging operation can be performed at a respectively connected electric vehicle. The power $P_{Connection}$ 16 . . . 7 that is also indicated corresponds to the established maximum power that can be withdrawn on average according to the contract in the time interval $t_{slot}$ 16 . . . 4 at an agreed price. The power withdrawn on average in the fixedly prescribed time interval $t_{slot}$ 16 . . . 4 can be calculated by $E_{slot} = \int_{t_0}^{t_2} P(t) dt$.

According to aspects of the invention, there is now provision for the withdrawn power within the prescribed time interval $t_{slot}$ 16 . . . 4 to be recorded and monitored continuously so that the energy $E_{slot}$ withdrawn overall in the interval is lower than or equal to a power $P_{Connection}$ 16 . . . 7 that can be withdrawn over the period $t_{slot}$ 16 . . . 4, which accordingly corresponds to: $E_{slot} \leq P_{Connection} * t_{slot} * A$, wherein A corresponds to a safety factor and is in the range 0 and 1, i.e. $0 \leq A \leq 1$. The power $E_{slot}$ withdrawn overall corresponds here to the surface area 16 . . . 10 characterized by hatching. By way of actuation of this kind, it is possible to ensure that quick charging is possible and still on average an established maximum power over a prescribed time interval is not exceeded so that a charging option is optimized taking into account a power draw for each prescribed time interval from a medium-voltage grid that is established, for example by contract.

What is claimed is:

1. A method for providing a charging park having a plurality of charging points, in which all of the charging points are connected to a medium-voltage grid by a common transformer with overloading capability, a power electronics system is connected at each charging point, which power electronics system is configured to perform a quick-charging operation of a connected electrically driven vehicle that is to be charged, the method comprising:

centrally or decentrally and continuously monitoring a power drawn from the medium-voltage grid jointly by the charging points at a respective time at a grid contact point connected upstream of the common transformer in a direction of the medium-voltage grid, and adjusting an average power drawn from the medium-voltage grid jointly by the charging points, in each case, over a prescribed time interval.

2. The method as claimed in claim 1, further comprising selecting a billing interval of a grid operator of the medium-voltage grid as the prescribed time interval.

3. The method as claimed in claim 1, further comprising adjusting the average power drawn from the medium-voltage grid jointly by the charging points over the prescribed time interval to a maximum power established for the prescribed time interval.

4. The method as claimed in claim 1, further comprising selecting a time interval in a range of from 5 to 60 minutes as the prescribed time interval.

5. The method as claimed in claim 3, further comprising selecting a grid connection power requested by a charging park operator as the maximum power established for the prescribed time interval.

6. The method as claimed in claim 3, further comprising:
centrally or decentrally and continuously monitoring the power drawn from the medium-voltage grid jointly by the charging points at a respective time,
dynamically adjusting the power drawn from the medium-voltage grid, in each case, for future times still located in the prescribed time interval for the average power drawn from the medium-voltage grid jointly by the charging points at a respective time depending on the maximum power established for the prescribed time interval, and
distributing the power drawn from the medium-voltage grid across the plurality of charging points depending on a demand required in each case from said charging points.

7. The method as claimed in claim 1, selecting a transformer that can be operated in overload for a minimum of 30 minutes as the transformer with overloading capability.

8. The method as claimed in claim 1, in which a calculation method for determining an overloading capability of the transformer with overloading capability is performed and, at a respective time, free overloading capabilities of the transformer are communicated to a control unit that actuates the respective charging points.

9. A system for supplying electrical power to a charging park having a plurality of charging points, the system comprising:
a power electronics system connected at each charging point, which power electronics system is configured to perform a quick-charging operation of a connected electrically driven vehicle that is to be charged,
one transformer with overloading capability, by means of which all of the charging points are coupled to a medium-voltage grid,
a first monitoring unit, which is arranged at a grid contact point, connected upstream of the transformer in the direction of the medium-voltage grid and is configured to monitor a power drawn from the medium-voltage grid jointly by the charging points at a respective time centrally or decentrally and continuously, and
a regulating unit, which is configured to adjust an average power drawn from the medium-voltage grid jointly by the charging points, in each case, over a prescribed time interval.

10. The system as claimed in claim 9, wherein the regulating unit is configured to adjust the average power drawn from the medium-voltage grid jointly by the charging points over the prescribed time interval to a maximum power established for the prescribed time interval.

11. The system as claimed in claim 9, wherein the transformer with overloading capability is a transformer that can be operated in overload for a minimum of 30 minutes.

12. The system as claimed in claim 9 further comprising a control unit, which is configured to actuate the respective charging points of the charging park and to distribute the electrical power provided from the medium-voltage grid by means of the transformer across the plurality of charging points depending on a demand requested by said charging points.

13. The system as claimed in claim 12 further comprising a second monitoring unit, which is configured to carry out a calculation method for determining an overloading capability of the transformer with overloading capability during operation of the transformer and, at a respective time, to communicate free overloading capabilities of the transformer to the control unit that actuates the respective charging points.

* * * * *